Figure 1:
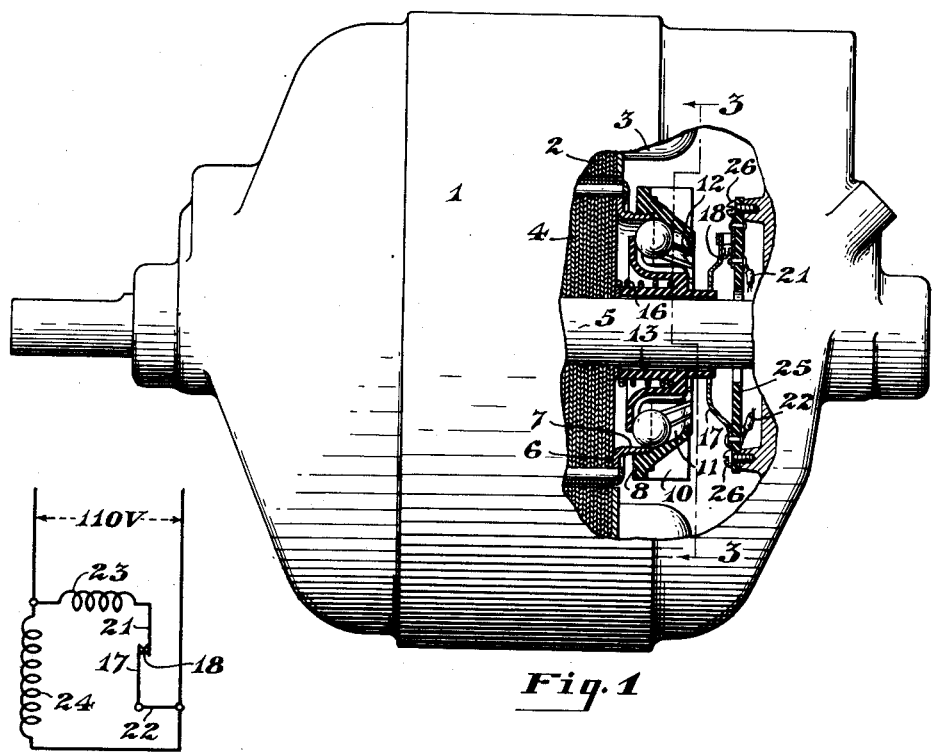

Jan. 16, 1940.   J. J. McCABE   2,187,207
CENTRIFUGALLY ACTUATED DEVICE
Filed Feb. 11, 1936

INVENTOR.
John J. McCabe
BY Edmund J. Te Pas
his ATTORNEY.

Patented Jan. 16, 1940

2,187,207

UNITED STATES PATENT OFFICE 2,187,207

CENTRIFUGALLY ACTUATED DEVICE

John J. McCabe, Euclid, Ohio, assignor to The Apex Electrical Manufacturing Company, Cleveland, Ohio, a corporation of Ohio Application February 11, 1936, Serial No. 63,401

3 Claims. (Cl. 200—80)

This invention relates to electric motors and centrifugally-actuated devices adapted for use in connection therewith.

The present invention is concerned with the control of single-phase induction motors and it also relates to centrifugal actuators of the general type shown in the following U. S. Letters Patent:

W. A. Chryst, 1,842,820, January 26, 1932; Z. C. Bradford, 1,883,872, October 25, 1932; A. M. Harrelson, 1,910,245, May 23, 1933.

The aforesaid patents show centrifugally-operated switches and centrifugally-operated clutches for use in connection with electric motors; the actuation for such clutches and switches being of a type employing a plurality of spherical weights which move radially under the influence of centrifugal force to actuate either the switch or the clutch, or both a switch and clutch as the case may be, in accordance with the speed of the motor.

When a device of this sort is used in connection with a single-phase induction motor employing a squirrel cage armature, it is important that the operation of the switch or clutch be controlled within rather close limits as regards the rotational velocity of the armature shaft. It is a characteristic of motors of this type that in starting the motor the torque falls off rather rapidly at a predetermined speed somewhat less than the rated running speed of the motor if the starting winding is kept in circuit with the running winding.

It is important therefore, in cases where the centrifugal device operates a clutch, that such clutch be thrown into engagement at a speed close to and slightly less than that corresponding to the maximum torque of the motor. Where a centrifugal device is provided for cutting out the starting windings of the motor, it is important that such windings be cut out at a given speed for if they are permitted to remain in circuit with the current supply, they cause the motor torque to fall off rather rapidly after a predetermined speed has been reached, and at the same time, the heavy current load on windings of the motor causes them to overheat and burn out if operated in this manner for any length of time.

It is also important that the operation of the switch be of a positive nature, for gradual breaking of the switch contacts increases the resistance through the switch, thus cutting down the current through the starting windings causing the motor speed to fall off with the result that it is difficult to cut out the starting windings at the proper point in the speed of the motor.

In certain motors of the type referred to, having a rated running speed of 1450 R. P. M., the maximum torque, with the starting winding in circuit, occurs at approximately 1200 R. P. M. It has been found that very satisfactory operation is obtained by having the starting winding of the motor cut out at speeds between 1000 and 1200 R. P. M. of the armature when the motor is started. It also has been found that satisfactory operation of a motor of the type referred to, is obtained by having the starting winding cut in at between 500 and 600 R. P. M. of the armature when the speed of the motor is cut down because of its being subjected to heavy loads.

The reason for having the starting winding switch operate at a much lower speed upon slowing down than it does upon the starting of the motor, is to reduce wear on the switch and its actuating mechanism. In machines having considerable momentum, as for example, grinders and the like, if the switch cut in at the same speed it cut out, as for example, at 1100 R. P. M., the switch parts and actuating mechanism therefor would be in rubbing contact for a much greater length of time than they would be if the switch cut out at 500 or 600 R. P. M.

It is the object of the present invention to provide an electric motor having a starting winding and a cut-out switch therefor, in which the switch operates in a positive manner at a predetermined speed with a snap-action; the actuation or opening of the switch occurring at a higher armature velocity during the starting or positive acceleration of the armature than does the closing of the switch upon the slowing down or negative acceleration of the armature.

Another object of the invention relates to the provision of an electric motor having a centrifugal actuated device having portions which serve as an air circulating or cooling fan for the motor.

Another object of the invention relates to the provision of a generally simplified, centrifugal actuator which operates with a snap-action at a substantially constant and predetermined speed.

A further object of the invention relates to the provision of a simple and inexpensive device of the type described, which is quiet in operation and which employs a minimum number of operating parts which are of simple and inexpensive construction.

These and other objects of the invention will become more apparent and better understood after consideration has been given to the following detailed description of the invention taken in connection with the drawing which shows, merely by way of illustration, structure adapted for carrying out the objects of the invention.

Figure 4:
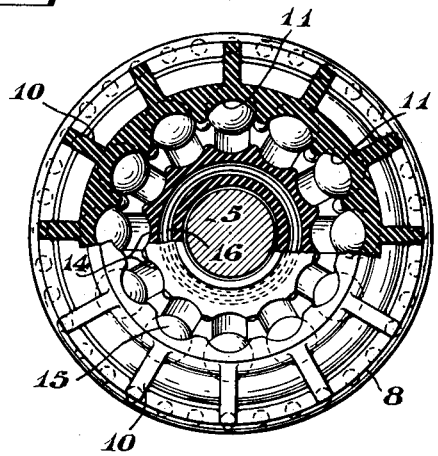
Figures 2, 3:
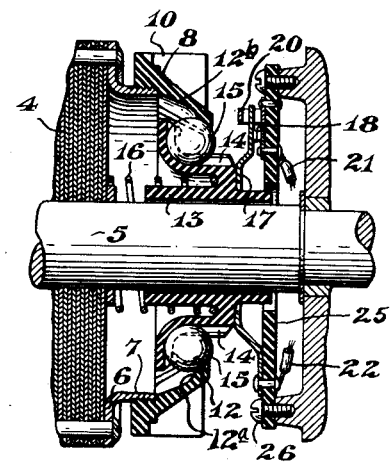

The various figures of the accompanying drawing show, merely by way of illustration, one form the invention may assume, in which Figure 1 is a side elevational view, partly in section, of an electric motor and switch illustrative of the invention and in which the switch is shown in open position; Figure 2 is a sectional view taken on line 2—2, Figure 1; Figure 3 is a detail view corresponding to Figure 1, showing the switch in closed position; and Figure 4 is a diagrammatical view of the windings of the motor.

The motor illustrated herein comprises a motor case 1, providing a housing for a stator 2, having stator windings 3 and an associated squirrel cage armature 4 rotatable inside the stator and carried by an armature shaft 5. The armature is provided with an end-plate 6 having an offset threaded flange 7, upon which an outer switch ball guide member 8 is removably and threadably secured. A plurality of fan blades 10 are provided by the guide member 8 and preferably formed integrally therewith. The interior of the guide member 8 is provided with a plurality of grooves 11 which extend lengthwise of the armature axis and at an angle thereto.

The slope of the grooves is different for different portions of the grooves, being greatest for the intermediate portion 12ª of the groove. The slope of the portion of the groove nearest to the armature shaft is indicated at 12 and the slope of the portion farthest away from the armature shaft is indicated at 12ᵇ.

The speed of the armature at which the opening of the switch takes place upon starting of the motor, depends in a large measure, upon the angle of the slopes 12 and 12ᵇ and conversely the speed of the armature at which the closing of the switch takes place upon the slowing down of the motor is a function of the slopes 12ᵇ and 12ª. By proper selection of the slopes of the grooves, the switch may be made to operate in the manner described and the preferred mode of operation may be varied over wide limits by changing the slopes 12, 12ª and 12ᵇ.

An inner guide switch ball member 13 is loosely mounted upon the shaft 5 for axial and slidable movement therealong. This member is provided with guideways 14 registering with the guideways 11 formed in the outer guide element 8. Each of the registering guideways 11 and 14 are in the members 8 and 13 respectively, provided for the reception of a spherical weight in the shape of a ball 15.

When the motor is at rest, the balls are maintained in the position shown in Figure 3 by the action of the spring 16 which serves to urge the guide member 13 to the position illustrated in this figure. With the parts in this position, an outer annular shoulder of the guide member 13 contacts with a spring 17 which carries one of the contacts of a switch 18. A stop arm 20 is provided for limiting the movement of the switch spring 17 in one direction. The cooperating contacts of the switch 18 are connected one to a conductor 21 and the other to a conductor 22.

As shown in diagrammatical view, Figure 4, the contacts of the switch 18 control the current supply of the starting winding 23 of the motor, the running winding of which is indicated by the numeral 24. The switch 18 is carried by a plate 25 formed from an electrically non-conducting material which may be removably secured in the motor by any suitable means, such as, screws 26, 26.

The provision of grooves or guideways each having a slope which changes abruptly at a point intermediate the length of the guideway, causes the spherical weights 15 to move radially of the motor axis at different accelerations over the different portions of the guideway for uniform acceleration of the motor shaft. With the slopes for the guideways corresponding substantially to those shown in the drawing, when the motor is started, the weights move along the initial part 12 of the guideways 11 at a relatively slow speed which increases sharply when the slope 12ª of each of the guideways is reached. This point, in the travel of the balls, is intended to correspond to the position which they occupy just before the contacts of the switch 18 are separated, so that such separation takes place at a predetermined fixed point, which, of course, may be controlled within rather wide limits by the tension exerted by the spring 16, and the point of throwout of the switch also may be changed by adjusting the switch to open at a different point in the travel of the spherical weights or balls 15.

It is important that the cutting out of the starting winding be effected in a positive manner or with a snap-action rather than by a gradual breaking of the circuit in order to prevent arcing of the switch contacts as well as overheating of the starting winding, as may occur with a slow acting switch which, when partially opened, would cut down the current through the starting winding enough to slow down the motor and if the motor were under sufficient load, it might run this way for a considerable length of time to the damage of the starting winding.

The rotatable and axially movable guide members of the centrifugal actuator are constructed from an electrically non-conducting material, as for example, one of the aldehyde condensation products which may be readily molded into the shape shown. This material provides an actuator which is quiet in operation and which is not apt to cause short-circuiting between the conductors connected to the switch. The outer guide member may be readily removed for replacement or repair, and by forming motor cooling fan blades integrally thereon, the expense of a separate fan is eliminated.

The centrifugal actuator disclosed herein is also adapted for the actuation of clutches of the type shown in the Chryst and Bradford patents previously mentioned, and it may have applications in connection with devices having no relation to electric motors, although its use in the present case is particularly adapted for motors of the type described by reason of the operating characteristics of such motors.

The foregoing description and the accompanying drawing to which it relates, describes what might be termed the preferred mode of practicing the invention. It is to be clearly understood, however, that the invention includes each and every novel feature or combination of novel features herein disclosed, subject only to the restrictions of the prior art, and that the invention may assume other forms and it is not to be limited to the particular and specific structure shown and described herein, and the right is reserved to add broader or more specific claims to any such feature or combination of features of the invention as may appear to be warranted upon learning more about the prior art, even though such broader or more specific claims may appear to involve a departure from the invention defined by the claims originally presented upon the filing of this application.

Having thus described my invention what I claim is:

1. A centrifugal switch for a motor having a rotor comprising a non-metallic annulus secured to the end of said rotor concentric of the rotor axis, the inner wall of said annulus being provided with a plurality of axially extending grooves, said grooves being inclined ralially toward the axis of the rotor, a non-metallic sleeve arranged within said annulus and movable axially with respect thereto, said sleeve being provided on its outer periphery with a plurality of grooves, and centrifugally responsive members arranged in said grooves, spring means normally tending to urge said sleeve axially in opposition to centrifugal force exerted through said members and into engagement with a movable switch member.

2. Centrifugal apparatus for electric motors having a rotor and stator, said rotor provided with an annular metal ring on the end face thereof, a non-metallic annulus secured to said ring, the inner wall of said annulus decreasing in diameter outwardly away from the rotor, a shaft on said rotor extending through said annulus and a sleeve slidably mounted on said shaft within the annulus, said sleeve having an outer wall increasing in diameter toward the rotor, a plurality of spherical weights arranged between the outer wall of the sleeve and the inner wall of said annulus, and spring means arranged between said sleeve and rotor tending to urge the sleeve away from the rotor and opposing centrifugal force exerted through said weights acting to move the sleeve toward the rotor.

3. Centrifugal apparatus for electric motors having a rotor and stator, said rotor provided with an annular metal ring on the end face thereof, a non-metallic annulus secured to said ring, the inner wall of said annulus decreasing in diameter outwardly away from the rotor, a shaft on said rotor extending through said annulus and a sleeve slidably mounted on said shaft within the annulus, said sleeve having an outer wall increasing in diameter toward the rotor, a plurality of spherical weights arranged between the outer wall of the sleeve and the inner wall of said annulus, spring means arranged between said sleeve and rotor tending to urge the sleeve away from the rotor and opposing centrifugal force exerted through said weights acting to move the sleeve toward the rotor, and a switch fixed with respect to said stator arranged in alignment with said sleeve and adapted to be moved thereby.

JOHN J. McCABE.